(12) United States Patent
Kim et al.

(10) Patent No.: US 8,017,420 B2
(45) Date of Patent: Sep. 13, 2011

(54) METHOD OF FORMING OPTICAL WAVEGUIDE

(75) Inventors: In-Gyoo Kim, Daejeon (KR);
Dong-Woo Suh, Daejeon (KR);
Gyung-Ock Kim, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 23 days.

(21) Appl. No.: 12/491,443

(22) Filed: Jun. 25, 2009

(65) Prior Publication Data
US 2010/0144075 A1    Jun. 10, 2010

(30) Foreign Application Priority Data
Dec. 5, 2008  (KR) .................. 10-2008-0123097

(51) Int. Cl.
*H01L 21/00* (2006.01)

(52) U.S. Cl. ............ 438/31; 438/42; 438/411; 438/430; 438/426; 257/E21.108; 257/E21.386; 257/103; 257/E21.579; 385/14

(58) Field of Classification Search ............... 438/31, 438/42, 411, 430, 426; 257/E33.068, E21.108, 257/E21.386, 103, E21.579
See application file for complete search history.

(56) References Cited

U.S. PATENT DOCUMENTS
5,987,196 A * 11/1999 Noble ............... 385/14

FOREIGN PATENT DOCUMENTS
| | | | |
|---|---|---|---|
| JP | 2001021744 A | 1/2001 | |
| KR | 1020010030200 A | 4/2001 | |
| KR | 1020050043137 A | 5/2005 | |

OTHER PUBLICATIONS
B. E. Deal et al., "General Relationship for the Thermal Oxidation of Silicon," Journal of Applied Physics, Dec. 1965, pp. 3770-3778, vol. 36, No. 12.

* cited by examiner

*Primary Examiner* — Matthew Smith
*Assistant Examiner* — Wilner Jean Baptiste

(57) ABSTRACT

Provided is a method of forming optical waveguide. The method includes forming a trench on a semiconductor substrate to define an active portion, and partially oxidizing the active portion. An non-oxidized portion of the active portion is included in a core through which an optical signal passes, and an oxidized portion of the active portion is included in a cladding.

12 Claims, 5 Drawing Sheets

METHOD OF FORMING OPTICAL WAVEGUIDE

CROSS-REFERENCE TO RELATED APPLICATIONS

This U.S. non-provisional patent application claims priority under 35 U.S.C. §119 of Korean Patent Application No. 10-2008-0123097, filed on Dec. 5, 2008, the entire contents of which are hereby incorporated by reference.

BACKGROUND OF THE INVENTION

The present invention disclosed herein relates to a method of forming semiconductor integrated circuit, and more particularly, to a method of forming optical waveguide, which can transfer an optical signal.

Recently, due to the highly-developed semiconductor industry, requirements are gradually increasing for the lightening, high-integrating and/or speeding up of a semiconductor integrated circuit. However, owing to various factors, it gradually becomes difficult to satisfy requirements for the semiconductor integrated circuit. For example, the signal transfer speed between the internal devices of the semiconductor integrated circuit or between the semiconductor integrated circuits may be reaching the limit because of a communication speed limit by an electric wire and/or heating.

As one method for solving this, a research is being actively made on optical communication and/or optical interconnection. That is, many researches are being made on a technology that replaces a signal between the semiconductor integrated circuits, a signal between the semiconductor integrated circuit and other electronic medium, and/or a signal between the internal devices of the semiconductor integrated circuit with an optical signal.

In such an optical communication and/or optical interconnection field, the optical signals may be transferred through an optical waveguide. In the optical waveguide transferring the optical signal, it may be required to decrease the loss of the optical signal. At present, many researches are being made on the optical waveguide that is suitable for the semiconductor integrated circuit and can decrease the loss of the optical signal.

SUMMARY OF THE INVENTION

The present invention provides a method of forming optical waveguide having superior characteristics.

Embodiments of the present invention provide methods of forming optical waveguide, the methods may include: forming a trench on a semiconductor substrate to define an active portion; and partially oxidizing the active portion, wherein a non-oxidized portion of the active portion is included in a core through which an optical signal passes, and an oxidized portion of the active portion is included in a cladding.

In some embodiments, the partially oxidizing the active portion may include: forming a capping semiconductor pattern on a top surface and an upper sidewall of the active portion to expose a lower sidewall of the active portion; and oxidizing a lower portion of the active portion and the capping semiconductor pattern to form the cladding by an oxidation process.

In other embodiments, the capping semiconductor pattern may be completely oxidized by the oxidation process.

In still other embodiments, the forming the capping semiconductor pattern may include: forming a sacrificial layer pattern filling the trench; recessing the sacrificial layer pattern to expose the upper sidewall of the active portion; conformally forming a capping semiconductor layer on the substrate; removing the capping semiconductor layer on the recessed sacrificial layer pattern to form the capping semiconductor pattern, and to expose the recessed sacrificial layer pattern; and removing the recessed sacrificial layer pattern to expose the lower sidewall of the active portion.

In even other embodiments, the method may further include forming a buffer layer on the top surface and the exposed upper sidewall of the active portion before forming the capping semiconductor layer.

In yet other embodiments, the buffer layer may be formed of the same material as the cladding.

In further embodiments, the capping semiconductor pattern may contact the top surface and the upper sidewall of the active portion, and a surface portion including the top surface and the upper sidewall of the active portion may be oxidized.

In still further embodiments, the cladding may surround a sidewall, a top surface and a bottom surface of the optical waveguide.

In even further embodiments, the cladding may fill the trench.

In yet further embodiments, the capping semiconductor pattern may include the same semiconductor element as a semiconductor element constituting the semiconductor substrate.

In yet further embodiments, the semiconductor substrate may be a silicon substrate, and the cladding may be formed of silicon oxide.

BRIEF DESCRIPTION OF THE FIGURES

The accompanying figures are included to provide a further understanding of the present invention, and are incorporated in and constitute a part of this specification. The drawings illustrate exemplary embodiments of the present invention and, together with the description, serve to explain principles of the present invention. In the figures.

DETAILED DESCRIPTION OF PREFERRED EMBODIMENTS

Figure 1:
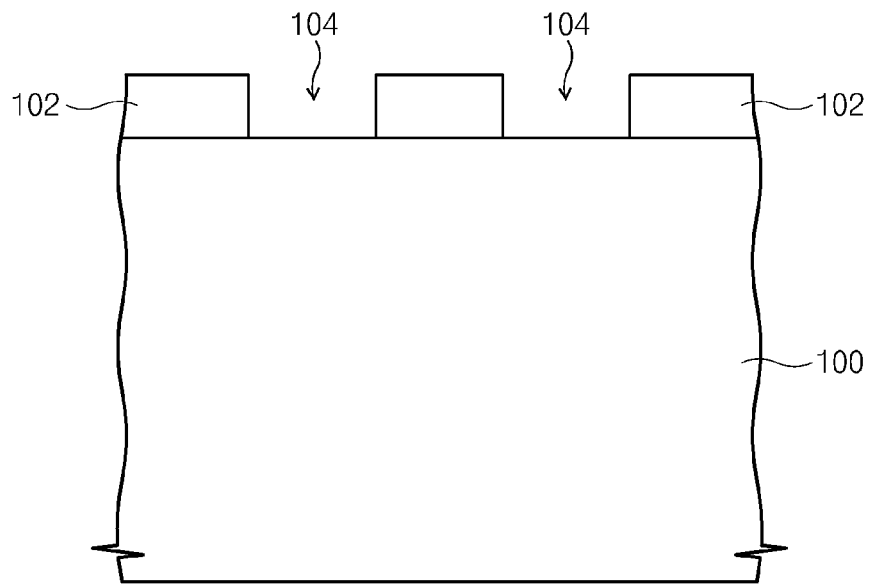
FIGS. 1 to 8 are cross-sectional views for describing a method of forming optical waveguide according to an embodiment of the present invention.

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

In the figures, the dimensions of layers and regions are exaggerated for clarity of illustration. It will also be understood that when a layer is referred to as being 'on' another layer or substrate, it can be directly on the other layer or substrate, or intervening layers may also be present. Further, it will be understood that when a layer is referred to as being 'under' another layer, it can be directly under, and one or more intervening layers may also be present. In addition, it will also be understood that when a layer is referred to as being 'between' two layers, it can be the only layer between the two layers, or one or more intervening layers may also be present. Like reference numerals refer to like elements throughout.

Hereinafter, exemplary embodiments of the present invention will be described in detail with reference to the accompanying drawings.

FIGS. 1 to 8 are cross-sectional views for describing a method of forming optical waveguide according to an embodiment of the present invention.

Referring to FIG. 1, a mask pattern 102 having an opening 104 may be formed on a semiconductor substrate 100. The opening 104 exposes a portion of the semiconductor substrate 100. The semiconductor substrate 100 may be a bulk substrate formed of a semiconductor material. The semiconductor substrate 100 may be a bulk silicon substrate. The semiconductor substrate 100 may be a single crystal state. The mask pattern 102 may be formed of a material having an etch selectivity with respect to the semiconductor substrate 100. For example, the mask pattern 102 may be formed of a photoresist. On the contrary, the mask pattern 102 may be a hard mask material including a nitride.

Figure 2:
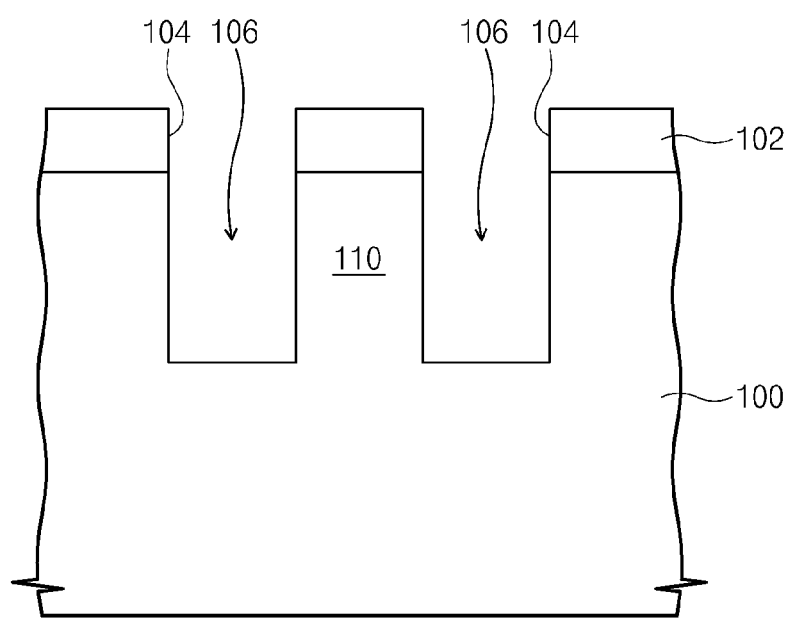

Referring to FIG. 2, the semiconductor substrate 100 exposed in the opening 104 is etched using the mask pattern 102 as an etch mask to form a trench 106. The semiconductor substrate 100 exposed in the opening 104 may be etched by an anisotropic etching process. For example, the exposed semiconductor substrate 100 may be etched by a Reactive Ion Etching (RIE) process and/or an Inductively Coupled Plasma (ICP) etching process. The trench 106 defines an active portion 110. The active portion 110 corresponds to a portion of the semiconductor substrate 100 defined by the trench 106. Accordingly, the active portion 110 may be formed of the silicon of a single crystal state.

Figure 3:
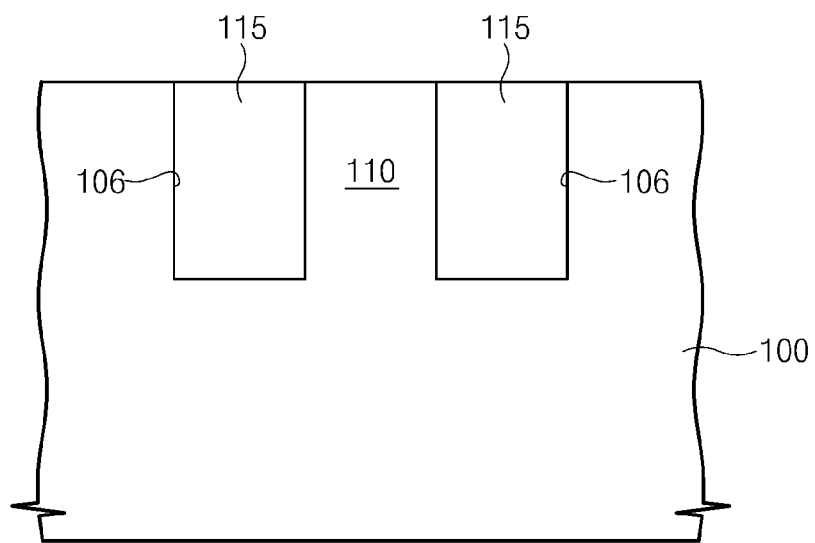

Referring to FIG. 3, the mask pattern 102 is removed from the semiconductor substrate 100 having the active portion 110. Subsequently, a sacrificial layer pattern 115 filling the trench 106 is formed. The sacrificial layer pattern 115 may be formed of a material having an etch selectivity with respect to the semiconductor substrate 100. For example, the sacrificial layer pattern 115 may be include at least one material selected from oxide (for example, TEOS oxide), oxynitride and nitride. A method of forming the sacrificial layer pattern 115 will be described. For example, a sacrificial layer filling the trench 106 may be formed over the semiconductor substrate 100, and the sacrificial layer external to the trench 106 may be removed, thereby forming the sacrificial layer pattern 115. The sacrificial layer outside the trench 106 may be removed by a planarization process. For example, the sacrificial layer outside the trench 106 may be removed by a blanket anisotropic etching process or a chemical mechanical grinding process.

Figure 4:
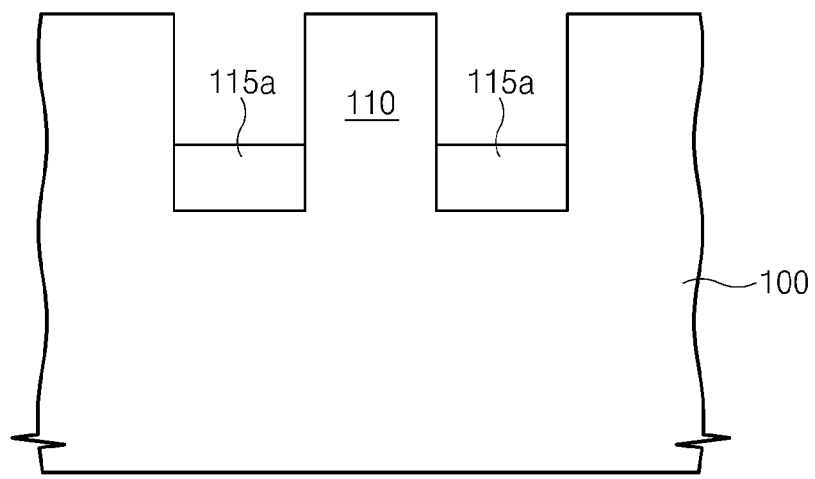

Referring to FIG. 4, the sacrificial layer pattern 115 is recessed to expose an upper sidewall of the active portion 110. At this time, a lower sidewall of the active portion 110 is covered by the recessed sacrificial layer pattern 115a. The sacrificial layer pattern 115 may be recessed by a wet etching process or a dry etching process. Moreover, a top surface and the upper sidewall of the active portion 110 may be exposed by recessing the sacrificial layer pattern 115.

Figure 5:
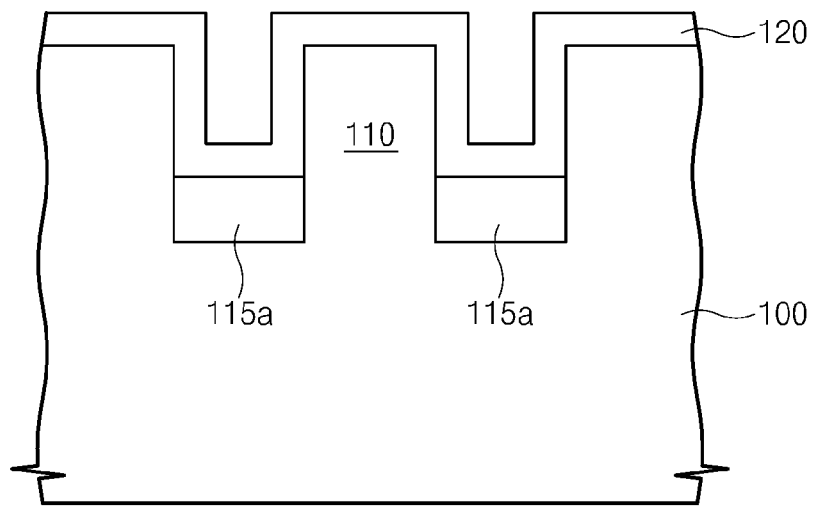

Referring to FIG. 5, a capping semiconductor layer 120 may be formed on the recessed sacrificial layer pattern 115a. The capping semiconductor layer 120 may be conformally formed on the semiconductor substrate 100. Accordingly, the capping semiconductor layer 120 may be formed along the top surface and the upper sidewall of the active portion 110 and a top surface of the recessed sacrificial layer pattern 115a with a substantially uniform thickness. After the capping semiconductor layer 120 is formed, and a portion of the trench 106 on the capping semiconductor layer 120 may be empty. As illustrated, the capping semiconductor layer 120 may contact the top surface and the upper sidewall of the active portion 110.

The capping semiconductor layer 120 may include the same semiconductor element as a semiconductor element constituting the semiconductor substrate 100. For example, the semiconductor substrate 100 may be a silicon substrate, and the capping semiconductor layer 120 may be formed of silicon. The capping semiconductor layer 120 may be a poly crystal state. On the contrary, the capping semiconductor layer 120 may be an amorphous state. The thickness of the capping semiconductor layer 120 may be suitably formed for a subsequent formed cladding. Relevant description will be made in detail below.

Figure 6:
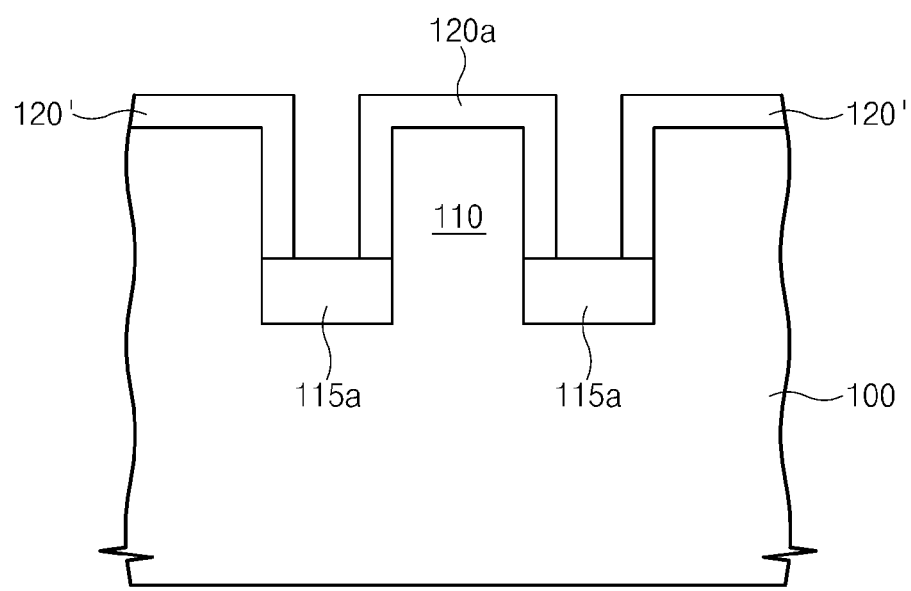

Referring to FIG. 6, the capping semiconductor layer 120 on the top surface of the recessed sacrificial layer pattern 115a is removed to expose the top surface of the recessed sacrificial layer pattern 115a. At this time, a capping semiconductor pattern 120a is formed on the active portion 110. The capping semiconductor pattern 120a is disposed on the top surface and the upper sidewall of the active portion 110. A residual layer 120' of the capping semiconductor layer 120 may be disposed on the semiconductor substrate 100 which is disposed around the active portion 110.

Selectively removing the capping semiconductor layer 120 on the recessed sacrificial layer pattern 115a may be performed by a patterning process including a photolithography process and an etching process.

Figure 7:
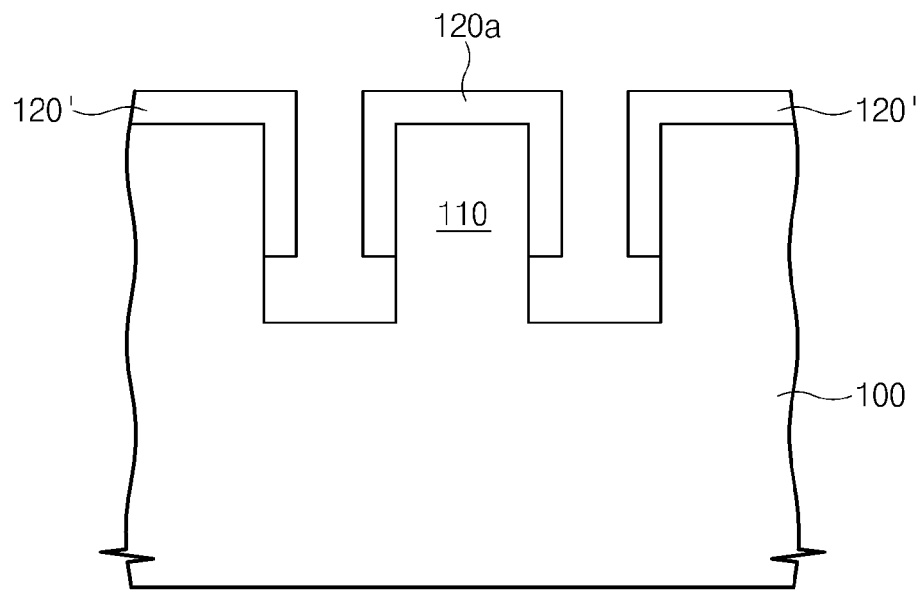

Referring to FIG. 7, the exposed sacrificial layer pattern 115a is removed to expose a lower sidewall of the active portion 110. At this point, the capping semiconductor pattern 120a is residual. That is, by removing the exposed sacrificial layer pattern 115a, the top surface and the upper sidewall of the active portion 110 are covered by the capping semiconductor pattern 120a and the lower sidewall of the active portion 110 is exposed. The exposed sacrificial layer pattern 115a may be removed by an isotropic etching process. For example, the exposed sacrificial layer pattern 115a may be removed by a wet etching process and/or an isotropic dry etching process.

Figure 8:
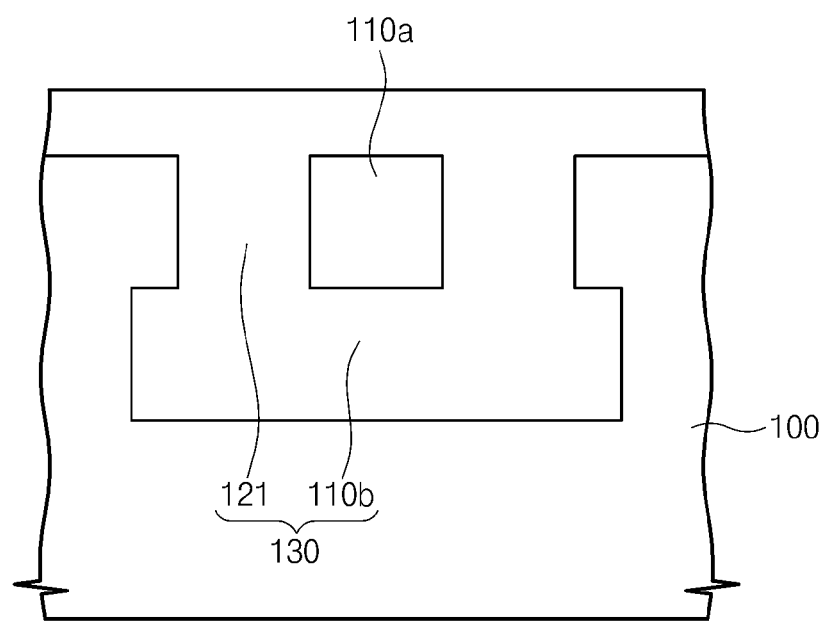

Referring to FIG. 8, an oxidation process is performed on the semiconductor substrate 100. The oxidation process may use heat and/or plasma as an energy source. For example, the oxidation process may be one of a thermal oxidation process, a plasma oxidation process and a thermal/plasma oxidation process. The active portion 110 is partially oxidized by the oxidation process. Specifically, the lower portion 110b of the active portion 110 is oxidized through the exposed lower sidewall of the active portion 110. A portion 110a of the active portion 110 disposed on the oxidized lower portion 110b is not oxidized. The non-oxidized portion 110a of the active portion 110 corresponds to a core 110a through which an optical signal passes. The core 110a includes at least one portion of the upper portion of the active portion 110. The oxidized lower portion 110b of the active portion 110 is included in a cladding 130. The oxidized lower portion 110b of the active portion 110 is defined as a lower cladding 110b.

An oxide layer 121 surrounding a sidewall and a top surface of the core 110a may be formed by the oxidation process. The oxide layer 121 is defined as an upper cladding 121. The upper cladding 121 is included in the cladding 130. In other words, the cladding 130 may include the lower cladding 110b and the upper cladding 121. Upon the oxidation process, the capping semiconductor pattern 120a is oxidized. At this point, the capping semiconductor pattern 120a may be completely oxidized. The upper cladding 121 may include an oxide which is formed by oxidizing the capping semiconductor pattern 120a.

The upper cladding 121 surrounds the sidewall and top surface of the core 110a, and the lower cladding 110b covers the bottom surface of the core 110a. Accordingly, the cladding 130 surrounds the sidewall, bottom surface and top surface of the core 110a. A refractive index of the cladding 130 is lower than that of the core 110a. The core 110a and the cladding 130 constitute an optical waveguide.

The thickness (i.e., the thickness of the capping semiconductor layer 120) of the capping semiconductor pattern 120a disposed on the upper sidewall of the active portion 110 may be the same as or less than a half of the width of the active portion 110. Accordingly, the capping semiconductor pattern 120a may be completely oxidized. Naturally, the thickness of the capping semiconductor pattern 120a is greater than 0. In a case where the thickness of the capping semiconductor pattern 120a is less than a half of the width of the active portion 110, the surface portion of the active portion 110 under the capping semiconductor pattern 120a may also be oxidized by the oxidation process. Accordingly, the upper cladding 121 may include an oxide which is formed by oxidizing the capping semiconductor pattern 120a and an oxide which is formed by oxidizing the surface portion of the active portion 110. The surface portion of the active portion 110 includes the top surface and upper sidewall of the active 110 which are covered by the capping semiconductor pattern 120a. The width of the core 110a may be determined by the thickness of the capping semiconductor pattern 120a. For example, in a case where the thickness of the capping semiconductor pattern 120a is the substantially same as the half of the width of the active portion 110, the width of the core 110a may be the substantially same as the width of the active portion 110. On the other hand, in a case where the thickness of the capping semiconductor pattern 120a is less than the half of the width of the active portion 110, the width of the core 110a may be a value of two times the thickness of the oxidized surface portion subtracted from the width of the active portion 110.

The cladding 130 may be formed to fill the trench 106. Upon the oxidation process, the residual layer 120' of the capping semiconductor layer 120 may also be oxidized.

According to a method of forming the above-described optical waveguide, the active portion 110 is defined by forming the trench 106 on the bulk semiconductor substrate 110, and the core 110a and the lower cladding 110b are formed by partially oxidizing the active portion 110. Accordingly, the boundary surface between the core 110b and the lower cladding 110b may be formed very smoothly. Consequently, it minimizes diffused reflections of an optical signal at the boundary surface between the core 110a and the lower cladding 110b, so that an optical waveguide having superior characteristics can be implemented. Moreover, because the upper cladding 121 is formed by the oxidation process, the boundary surface between the core 110a and the upper cladding 121 may also can be very smooth. Accordingly, the diffuse reflection of the optical signal can be minimized.

If an optical waveguide is formed using an SOI substrate, various problems may occur. the boundary surface between a buried oxide layer and a silicon layer of the SOI substrate may be unstable. For example, in a case where the SOI substrate is formed by bonding a substrate having the silicon layer and a substrate having the buried oxide layer, void may locally occur between the buried oxide layer and the silicon layer. Accordingly, in a case where the silicon layer of the SOI substrate is formed as a core, failure may occur in the boundary surface between the core and a cladding (buried oxide layer). Moreover, in a case where the SOI substrate is formed in a Seperation by IMplanted OXygen (SIMOX) process, failure may further occur in the boundary surface between the silicon layer and the buried oxide layer. According to an embodiment of the present invention, an optical waveguide, however, is formed using the bulk semiconductor substrate 100, thereby improving productivity. Moreover, since the cladding 130 is formed by the oxidation process, the boundary surface between the core 110a and the cladding 130 can be formed in a very superior state.

Hereinafter, a modified embodiment of the present invention will be described with reference to FIGS. 9 and 10. A forming method according the modified embodiment of the present invention is similar to the method described with reference to FIGS. 1 to 8. Accordingly, like elements refer to like reference numerals, and the following description will be focused on the features of the modified embodiment of the present invention. The modified embodiment of the present invention may include the method described with reference to FIGS. 1 to 4.

Figure 9:
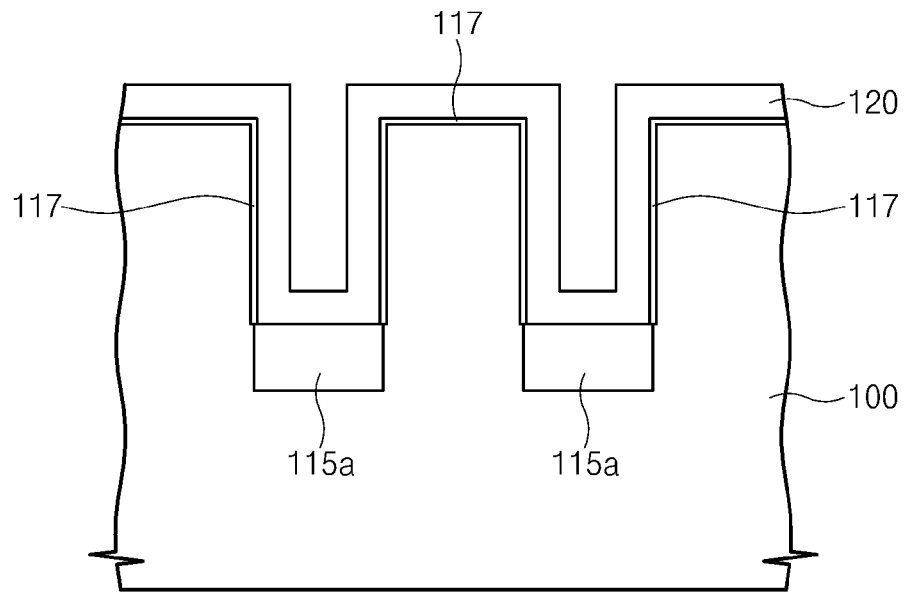
FIGS. 9 and 10 are cross-sectional views illustrating a modified embodiment of a method of forming an optical waveguide according to an embodiment of the present invention.
Figure 10:
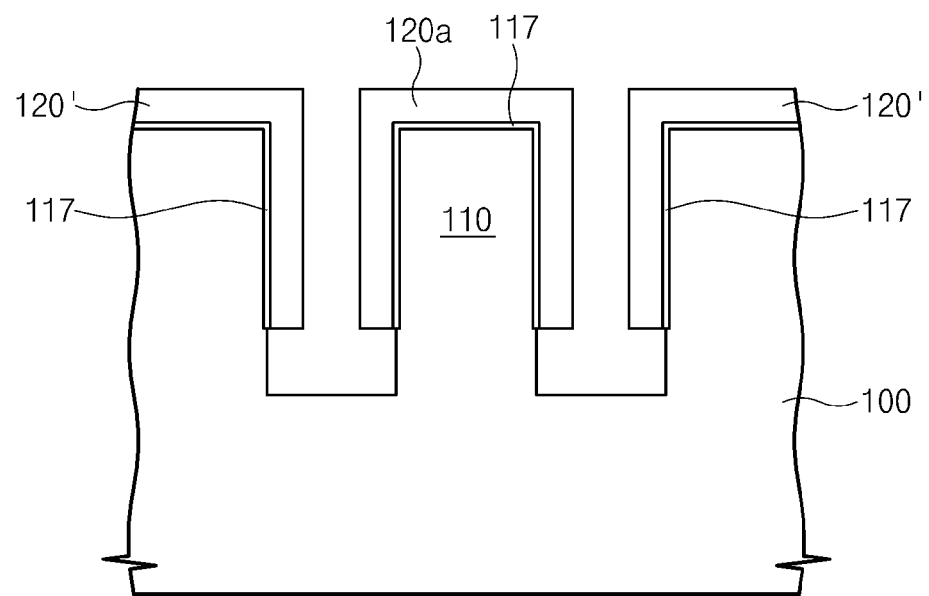

FIGS. 9 and 10 are cross-sectional views illustrating a modified embodiment of a method of forming an optical waveguide according to an embodiment of the present invention.

Referring to FIGS. 4 and 9, a buffer layer 117 may be formed on the semiconductor substrate 100 having the recessed sacrificial layer pattern 115a. The buffer layer 117 may be formed on the top surface and upper sidewall of the active portion 110. The buffer layer 117 may be formed by an oxidation process (for example, a thermal oxidation process, a plasma oxidation process, or thermal/plasma oxidation process). Accordingly, the buffer layer 117 may be restrictively formed on the exposed top surface and upper sidewall of the active portion 110. The buffer layer 117 may also be formed on the exposed semiconductor substrate 100 peripheral to the active portion 110.

Referring FIG. 10, the recessed sacrificial layer pattern 115a is exposed by removing the capping semiconductor layer 120 thereon, and the capping semiconductor pattern 120a is formed. The buffer layer 117 is interposed between the capping semiconductor pattern 120a and the active portion 110.

Subsequently, the exposed sacrificial layer pattern 115a is removed. Subsequently, the core 110a and cladding 130 of FIG. 8 may be formed by performing the oxidation process described with reference to FIG. 8. The cladding 130 according to an embodiment of the present invention may include the buffer layer 110 and an oxide which is formed by oxidizing the capping semiconductor pattern 120a. The buffer layer 117 is formed of the same material as that of the lower cladding 110b.

According to the modified embodiment of the present invention, upon an oxidation process for forming the cladding 130, it may be suppressed that the upper portion of the active portion 110 is oxidized by the buffer layer 117. In other words, the buffer layer 117 can serve as an oxidation stop layer. Accordingly, it may be easy to completely oxidize the capping semiconductor pattern 120a. Moreover, the core 110a may be implemented to have replicability.

As described above, embodiments of the present invention form the trench on the semiconductor substrate to define the active portion, and partially oxidize the active portion, thereby forming the core and the cladding. The core is the non-oxidized portion of the active portion, and the cladding is the oxidized portion of the active portion. Accordingly, the boundary surface between the core and the cladding has very superior characteristics, thereby enabling to implement the optical waveguide where the loss of light is minimized.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of forming optical waveguide, the method comprising:
    forming a plurality of trenches on a semiconductor substrate to define an active region between the trenches; and
    partially oxidizing the active region,
    wherein a non-oxidized portion of the active region is comprised in a core through which an optical signal passes, and an oxidized portion of the active region is comprised in a cladding.

2. The method of claim 1, wherein the partially oxidizing the active region comprises:
    forming a capping semiconductor pattern on a top surface and an upper sidewall of the active region to expose a lower sidewall of the active region; and
    oxidizing a lower portion of the active region and the capping semiconductor pattern to form the cladding.

3. The method of claim 2, wherein the capping semiconductor pattern is completely oxidized by the oxidation process.

4. The method of claim 2, wherein the forming the capping semiconductor pattern comprises:
    forming a sacrificial layer pattern filling the trench;
    recessing the sacrificial layer pattern to expose the upper sidewall of the active region;
    conformally forming a capping semiconductor layer on the substrate;
    removing a portion of the capping semiconductor layer on the recessed sacrificial layer pattern to form the capping semiconductor pattern, and to expose the recessed sacrificial layer pattern; and
    removing the recessed sacrificial layer pattern to expose the lower sidewall of the active region.

5. The method of claim 4, further comprising forming a buffer layer on the top surface and the exposed upper sidewall of the active region before forming the capping semiconductor layer.

6. The method of claim 5, wherein the buffer layer is formed of the same material as the cladding.

7. The method of claim 4, wherein the capping semiconductor pattern contacts the top surface and the upper sidewall of the active region, and a surface portion comprising the top surface and the upper sidewall of the active region is oxidized.

8. The method of claim 2, wherein the cladding surrounds a sidewall, a top surface and a bottom surface of the optical waveguide.

9. The method of claim 2, wherein the cladding fills the trench.

10. The method of claim 2, wherein the capping semiconductor pattern and the semiconductor substrate comprise the same material.

11. The method of claim 1, wherein the semiconductor substrate is a silicon substrate, and the cladding is formed of silicon oxide.

12. The method of claim 1, wherein the active region includes a portion of the semiconductor substrate.

* * * * *